United States Patent [19]

Ihara et al.

[11] Patent Number: 5,287,297
[45] Date of Patent: Feb. 15, 1994

[54] MAGNETIC DIRECTION FINDER WITH CORRECTING CIRCUIT

[75] Inventors: Yasuhiro Ihara, Neyagawa; Yoshiki Ueyama, Sakai; Mitsuhiro Yamashita, Osaka, all of Japan

[73] Assignee: Matsushita Electric Industrial Co., Ltd., Kadoma, Japan

[21] Appl. No.: 942,336

[22] Filed: Sep. 9, 1992

Related U.S. Application Data

[63] Continuation of Ser. No. 605,789, Oct. 30, 1990.

[30] Foreign Application Priority Data

Nov. 2, 1989 [JP] Japan .................... 1-287003

[51] Int. Cl.$^5$ .............................. G06F 15/20
[52] U.S. Cl. ........................ 364/571.02; 33/356; 364/449; 364/559
[58] Field of Search ............ 33/356; 364/449, 457, 364/559, 571.02, 571.05

[56] References Cited

U.S. PATENT DOCUMENTS

| | | | |
|---|---|---|---|
| 4,743,913 | 5/1988 | Takai | 33/356 X |
| 4,831,563 | 5/1989 | Ando et al. | 33/356 X |
| 4,862,398 | 8/1989 | Shimizu et al. | 33/356 X |
| 5,046,031 | 9/1991 | Wanous | 364/571.02 |
| 5,060,162 | 10/1991 | Ueyama et al. | 364/449 |
| 5,131,155 | 7/1992 | Takano et al. | 364/571.02 X |
| 5,159,556 | 10/1992 | Schorter | 364/449 |
| 5,172,322 | 12/1992 | Takano et al. | 364/449 |
| 5,187,872 | 2/1993 | Dufour | 33/356 |

FOREIGN PATENT DOCUMENTS 63-204112 8/1988 Japan .
8805153 7/1988 PCT Int'l Appl. .
2141551 12/1984 United Kingdom .

*Primary Examiner*—Edward R. Cosimano
*Attorney, Agent, or Firm*—Cushman, Darby & Cushman

[57] ABSTRACT

The direction of a terrestrial magnetism is detected by a terrestrial magnetism sensor mounted on a vehicle, and an output circle is generated on an X-Y coordinate by turning the vehicle on the ground, when the vehicle passes through a foreign magnetic fields the direction of the foreign magnetic field is detected by the terrestrial magnetism sensor, and the course thereof is determined on the basis of former output circle before passing through the foreign magnetic field and the output of an angular velocity sensor of the vehicle after passing it, then a new center of the output circle is determined by evaluating an intersection of the line representing the foreign magnetic field and the line representing the course of the vehicle on the X-Y coordinate.

3 Claims, 9 Drawing Sheets

MAGNETIC DIRECTION FINDER WITH CORRECTING CIRCUIT

This is a continuation of application Ser. No. 07/605,789, filed Oct. 30, 1990, now abandoned.

FIELD OF THE INVENTION AND RELATED ART STATEMENT

1. Field of the Invention

The present invention relates generally to a direction finding apparatus, and more particularly to a direction finding apparatus to be mounted on a vehicle in which an error of direction finding due to variation of magnetization of the vehicle is corrected during running of the vehicle.

2. Description of the Related Art

FIG. 6 is a block diagram of a navigation system of a vehicle which is disclosed in the Japanese published unexamined patent application Sho 63-204112. Referring to FIG. 6, terrestrial magnetism is detected by a terrestrial magnetism sensor 1, and a direction signal representing the course of a vehicle is output. The direction signal is output by two outputs of voltages which represent the respective components of X-Y coordinates comprising an ordinate corresponding to a front-back direction of the vehicle and an abscissa corresponding to a left-right direction which is perpendicular to the front-back direction.

FIG. 7 is a perspective view of an example of a terrestrial magnetism sensor 1 which is comprised of two coils 1A and 1B which are orthogonally aligned to each other. The terrestrial magnetism sensor 1 is mounted on the vehicle so that the axis of one of two coils is parallel to the front-back direction, and an axis C1 passing two intersections of the coils 1A and 1B is made to be perpendicular to the ground as presently known in the art. The terrestrial magnetism sensor 1 detects the intensity of the horizontal component of the terrestrial magnetism. Assuming that the vehicle is not magnetized, two output voltages x and y are shown on the X-Y coordinates as shown in FIG. 8. Referring to FIG. 8, an arrow R1 represents the direction of the terrestrial magnetism and points the "magnetism north", and the length of the arrow R1 represents the intensity. An angle $\theta 1$ represents the course of the vehicle. In this status, the vehicle is turned at least one turn on the ground. Consequently, the arrow R1 is rotated on the X-Y coordinates at the revolution axis of the original point "0", and the tip of the arrow R1 draws a circle E8. The circle E8 is named as an "output circle" by the inventor since it is drawn on the basis of the output of the terrestrial magnetism sensor 1. The "output circle" is called a "turning circle" in the prior art.

In an actual vehicle, the body and engine made mainly of steel is magnetized in a certain degree, and the magnetism affects the detected value of the terrestrial magnetism sensor 1. The effect is represented by shift of the output circle on the X-Y coordinates as shown in FIG. 9. Referring to FIG. 9, the center C3 of an output circle E9 is shifted to the coordinates $(x_3, y_3)$. The shift of the center of the output circle represents that the vehicle has the magnetism which has a value $x_3$ in X component and a value $y_3$ in Y component, and the direction thereof is pointed by an arrow D3.

Where the vehicle passes a place on which a high intensity magnetic field is generated by a large current in transmission lines, such as rails of an electric car such as at a "railroad crossing", the status of the magnetization of the vehicle is varied. The once-induced variation of the status of the magnetization does not return to the original status even after passing the place, but several days are required for restoration to the original status, as would be familiar to one skilled in the art. The above-mentioned magnetic field due to the electric lines is called a "foreign magnetic field" by the inventor.

FIG. 6 shows that a speed sensor 2 detects a revolution of a wheel of the vehicle, and thereby data of a vehicle speed and a distance of running of the vehicle are output. Map data representing a road network and the status of a road is memorized in a memory 3. The direction signal of the terrestrial magnetism sensor 1, the data of the vehicle speed and travel distance and the map data of the memory 3 are applied to a data processor 4 and are calculated, and the position of the vehicle is determined by dead-reckoning and is displayed on a display 6.

According to the prior art, the position and the direction of the road having the foreign magnetic field are memorized in the memory 3 with the map data of the road network in advance. When the vehicle has passed the place having the foreign magnetic field, the position of the center of the output circle is corrected on the basis of both the detected data of the terrestrial magnetism sensor 1 and the data memorized in the memory 3 designating the direction of the road. Then the course of the vehicle is determined on the basis of the corrected output circle.

In the direction finding apparatus in the prior art as mentioned above, the data of the road and the direction thereof which affect the magnetization of the vehicle have been required to be memorized in the memory 3 in advance. Since such operation requires a large amount of prior investigation, there is a difficulty in collecting the data of all roads for the road map.

Moreover, in order to determine the new center of the output circle after variation of the magnetization of the vehicle, the output data of the terrestrial magnetism sensor and the radius of the output circle have been utilized. The output circle which is used in operation of the navigation system of the prior art is formed at start of the vehicle on the basis of the terrestrial magnetism at the starting position. Since the intensity of the terrestrial magnetism varies depending on the position, the radius of the output circle is also varied depending on the position. Consequently, if the output circle at the starting position is used for determining the direction at the place which is apart from the starting position, occurrence of an error can not be eliminated.

OBJECT AND SUMMARY OF THE INVENTION

An object of the present invention is to provide a direction finding apparatus of which an error in direction finding caused by magnetization of a vehicle is corrected.

The direction finding apparatus in accordance with the present invention comprises:

a terrestrial magnetism sensor having two sensor elements arranged orthogonally to each other and vertically for detecting a terrestrial magnetism mounted on a vehicle, output circle calculation means for generating data of an output circle computed on the basis of the outputs of the two sensor elements of said terrestrial magnetism sensor on an X-Y coordinate at 360° turning of the vehicle on the ground, foreign magnetic field sensing means for finding direction of a foreign magnetic field which is caused by a current flowing through electric transmission lines, course finding means for finding course of the vehicle after passing through the foreign magnetic field, direction assuming means for determining an assumed direction on the basis of the detected data of the course finding means and the data of the former output circle before passing through the foreign magnetic field, output circle center calculation means for evaluating a distance deviation of a new center of the output circle after passing through the foreign magnetic field from the former center before passing through the foreign magnetic field on the basis of the direction of the foreign magnetic field and the direction detected by the angle sensing means, and output circle center renewal means for changing the position of the former center to the new center computed by the output circle center calculation means.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
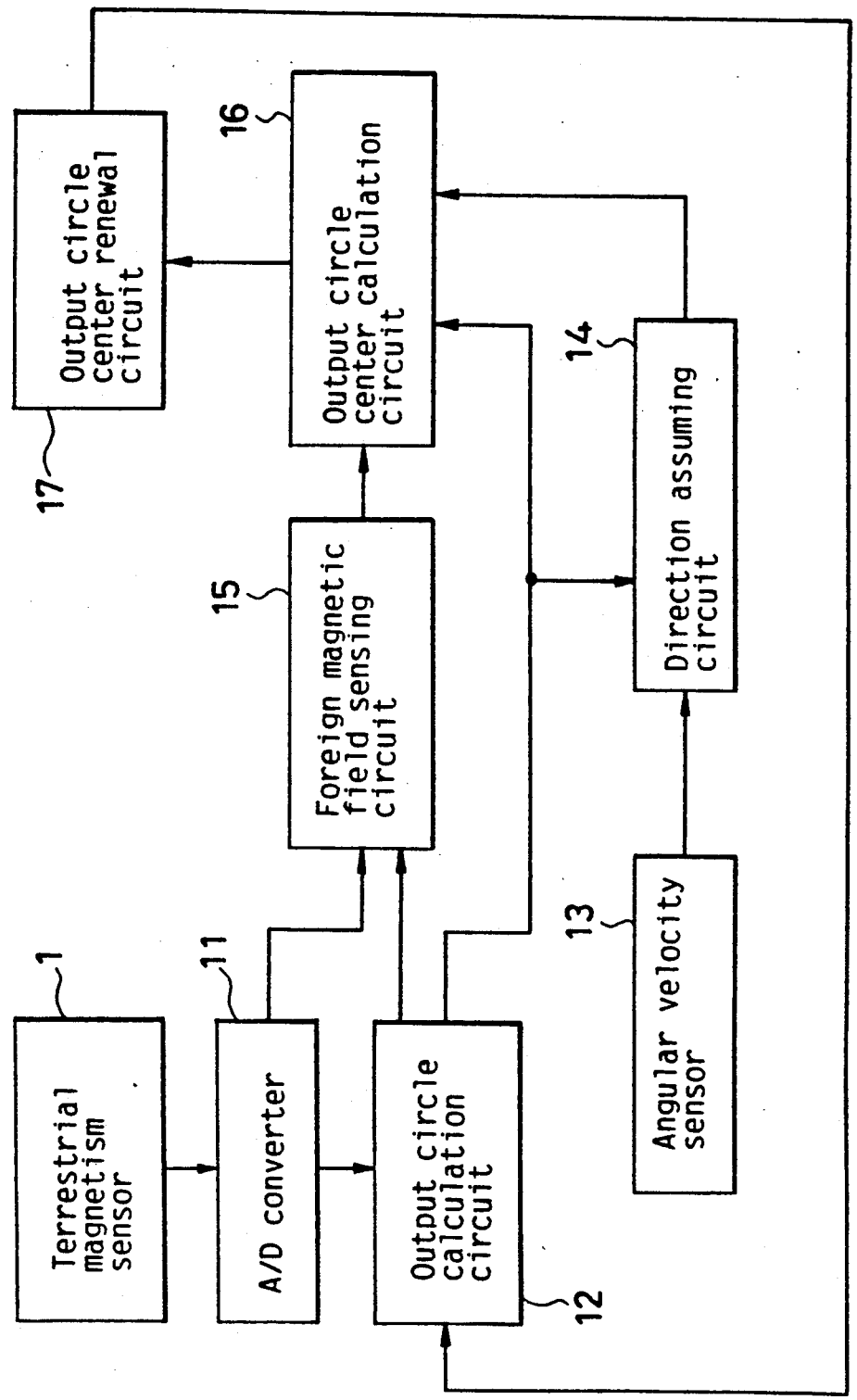
FIG. 1 is a block diagram of an embodiment of a direction finding apparatus in accordance with the present invention.
Figure 7:
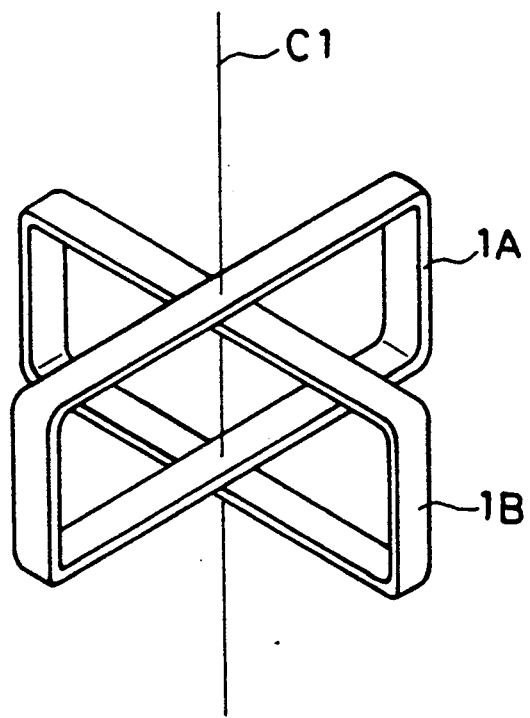
FIG. 7 is the perspective view of the terrestrial magnetism sensor.
Figure 8:
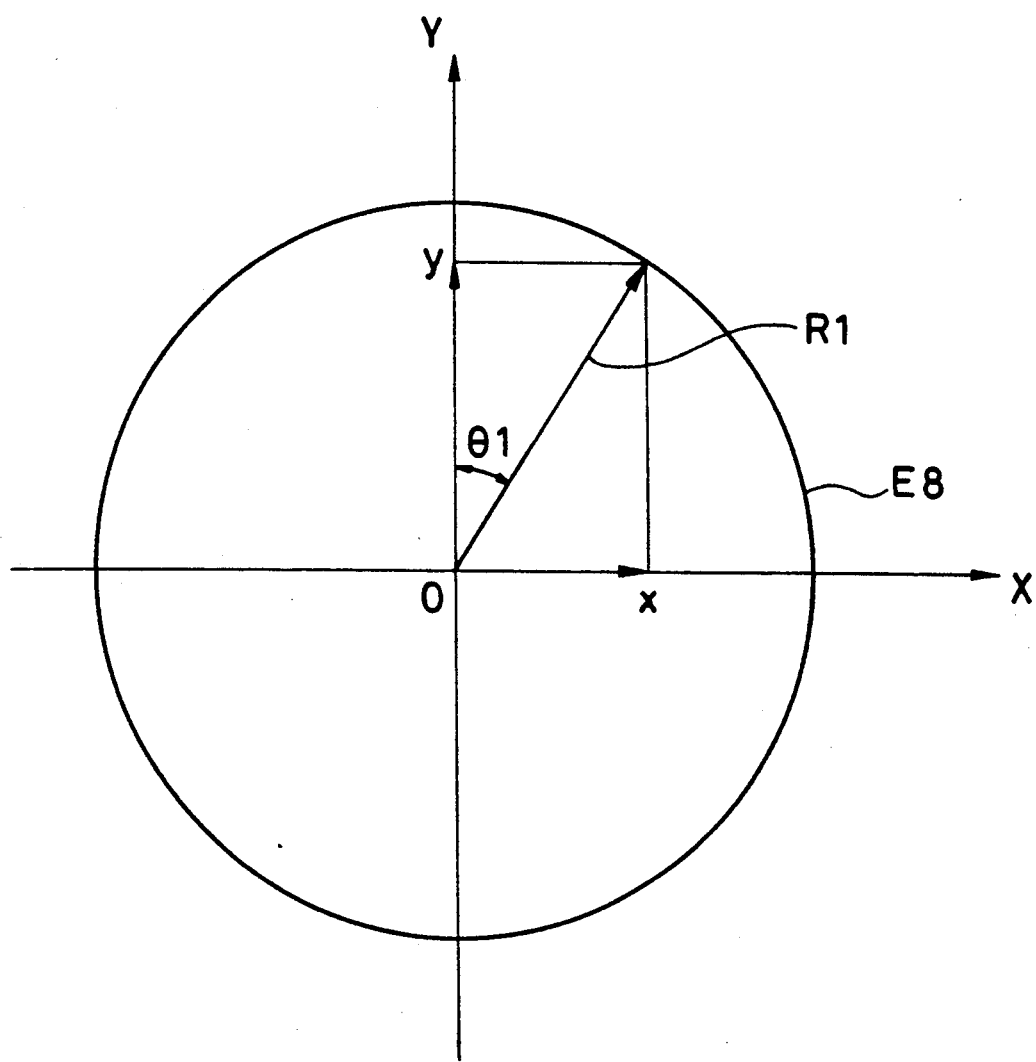
FIG. 8 is the graph of the output circle.
Figure 9:
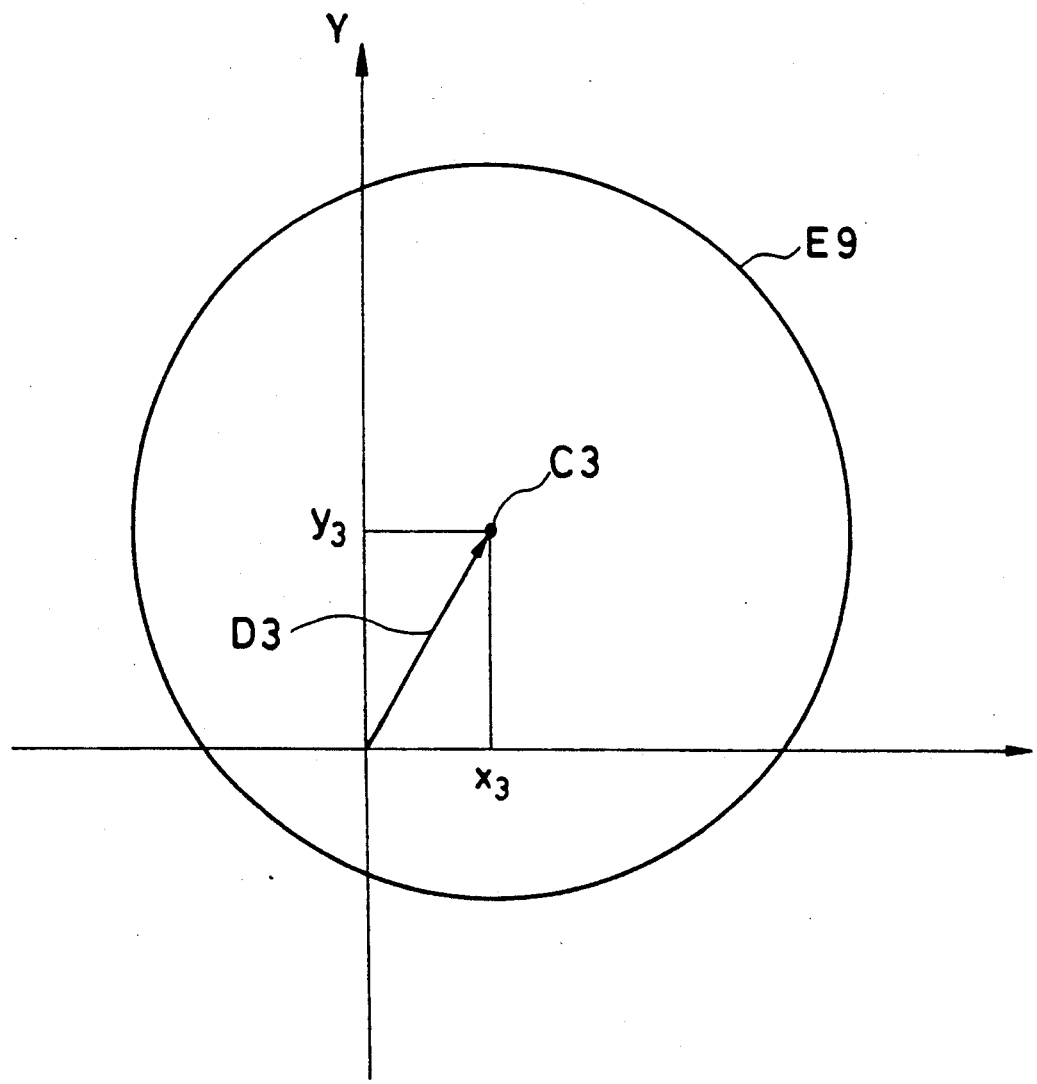
FIG. 9 is the output circle having the shifted center thereof in the prior art.

FIG. 1 is a block diagram of an embodiment of a direction finding apparatus in accordance with the present invention. Referring to FIG. 1, a terrestrial magnetism sensor 1 which is identical with that shown in FIG. 7 comprises two coils 1A and 1B which are orthogonally positioned to each other. The terrestrial magnetism sensor 1 is mounted on a vehicle so that a first coil of the sensor is provided on a first vertical plane which is parallel with a front-back axis of the vehicle, said vertical plane being vertical to a horizontal axis of the vehicle, and a second coil of the sensor is provided on a second vertical plane which is perpendicular to said front-back axis, said second vertical plane being vertical to said horizontal axis, and said first vertical plane and said second vertical plane intersect each other at the vertical axis C1 of the vehicle. That is, the mutual intersections of two coils 1A and 1B is perpendicular to the ground when the vehicle runs normally on a horizontal road, and horizontal axis of the first coil is parallel to the front-back direction of the vehicle. The direction signal which is output from the terrestrial magnetism sensor 1 is applied to an A/D converter 11 (FIG. 1) and is converted to a digital signal. The digital signal is applied to an output circle calculation circuit 12 and a foreign magnetic field sensing circuit 15. Then, the vehicle is turned on the ground at least one turn by suitable way, e.g. by being driven on a small circle, and hence an "output circle" is generated on X-Y coordinates in a manner which is familiar to one skilled in the art. The generated output circle is memorized in a memory which is comprised in the output circle calculation circuit 12.

An angular velocity sensor 13 is a course finding means and detects an angular velocity when the vehicle is changing its course. The output of the angular velocity sensor 13 is applied to a direction assuming circuit 14. In the direction assuming circuit 14, the direction of the vehicle at the present position is assumed with reference to the direction at a past position which is computed from the output circle calculation circuit 12, and a new distance data is output. The output of the distance assuming circuit 14 is applied to an output circle center calculation circuit 16. The output of the A/D converter 11 is also applied to a foreign magnetic field sensing circuit 15.

Operation of the embodiment is elucidated hereafter with reference to FIGS. 2, 3, 4 and 5.

Figure 2:
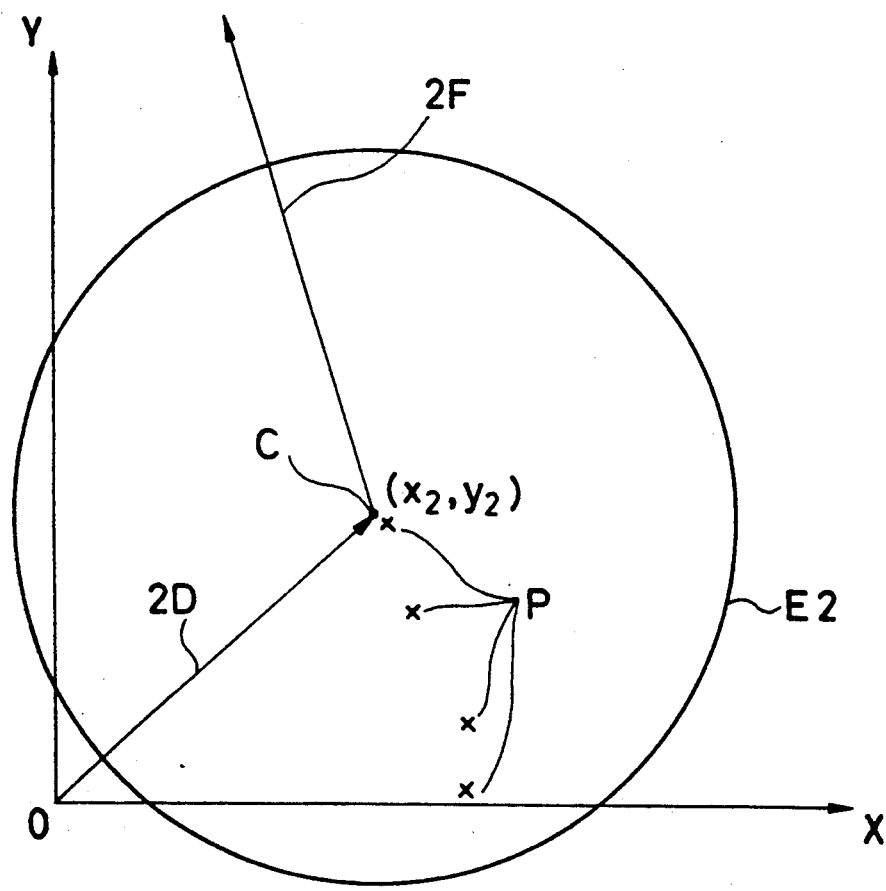
FIG. 2 is a graph of an output circle in the embodiment.

FIG. 2 is a graph of an output circle which is measured by passing a vehicle provided with the terrestrial magnetism sensor 1 on a railroad crossing having a foreign magnetic field, which is caused by a large current flowing through the railroad and electric transmission lines in proximity to the railroad crossing. Referring to FIG. 2, an output circle E2 shows an output circle of the state before passing the railroad crossing, and the center C is shifted from the point of origin 0 to a position $(x_2, y_2)$ of the tip of an arrow 2D by magnetization of the vehicle. The direction of the foreign magnetic field is shown by an arrow 2F. When the vehicle passes in the foreign magnetic field, status of the magnetization of the vehicle, namely the direction and intensity of the magnetization are affected by the foreign magnetic field and are varied thereby. The variation of the magnetization of the vehicle does not return to the original status very quickly after passing in the foreign magnetic field, but remains for several days and gradually returns to the original status.

When the magnetization of the vehicle is varied by the foreign magnetic field as mentioned above, the center coordinates $(x_2, y_2)$ of the output circle E2 is shifted on the X-Y coordinates. This was clarified by an actual measurement by the inventor showing that the moving direction of the center of the output circle E2 was inverse to that of the foreign magnetic field with respect to the center coordinates, and a moved center exists on a prolonged line of the arrow 2F as marked by crosses P. In the embodiment, the result which is obtained by the abovementioned measurement is utilized.

Figure 3:
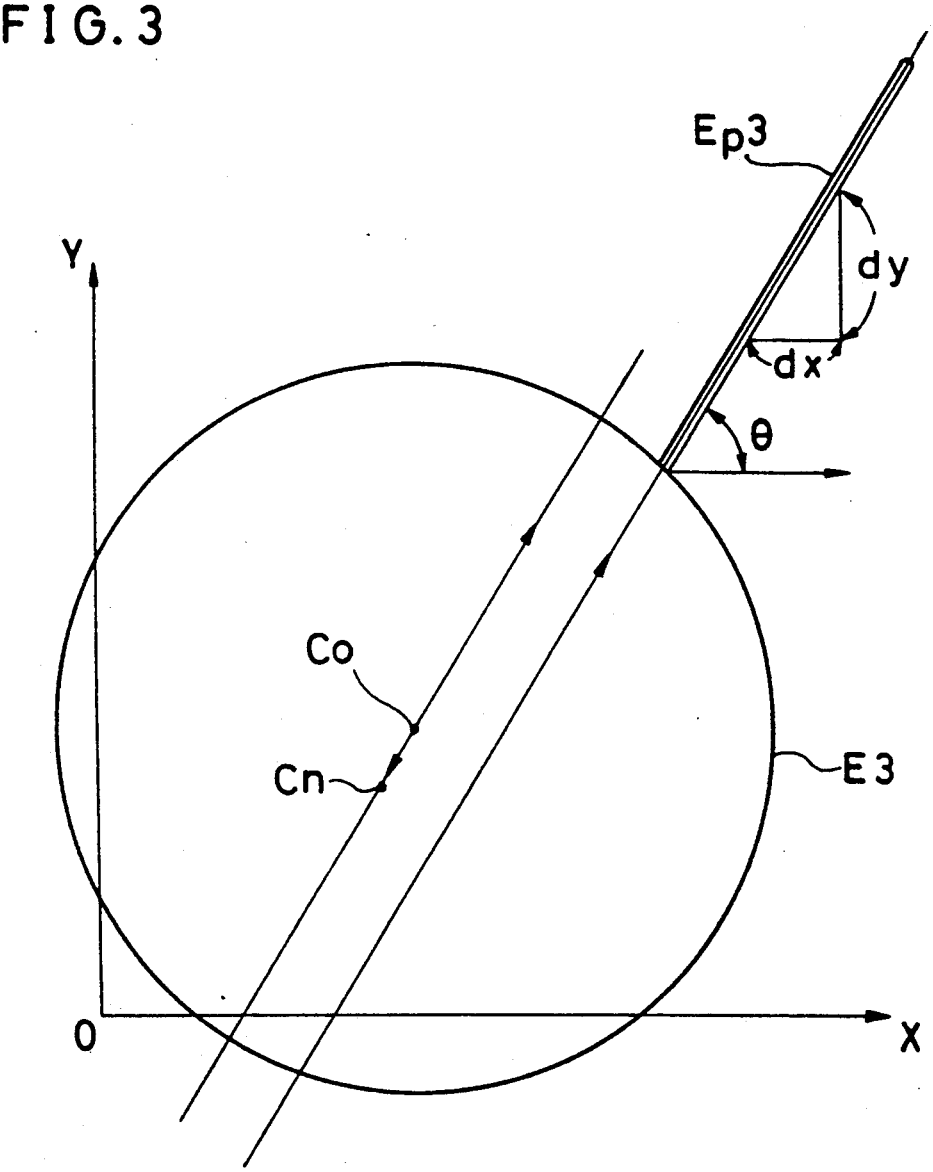
FIG. 3 is a graph of an output circle on which a loop due to a foreign magnetic field is superimposed.

FIG. 3 is a graph of an output circle which is partly distorted by the foreign magnetic field. When the vehicle is magnetized in a direction by passing in the foreign magnetic field, it is considered that a part of the output circle E3 protrudes to the direction of the magnetization as shown by a protrusion Ep3 having a slope $dy/dx$ and an angle $\theta$ to the horizontal. The distortion results in a protruding outward from the output circle E3 (shown in FIG. 3) or in depression inward thereof (not shown) in compliance with the direction of the foreign magnetic field. The center also changes from value $C_o$ to $C_n$. The value and direction of such distortion of the output circle is computed by comparing the direction signal of the output circle prior to entering the foreign magnetic field with the direction signal of the terrestrial magnetism sensor 1 after passing the foreign magnetic field.

Figure 5:
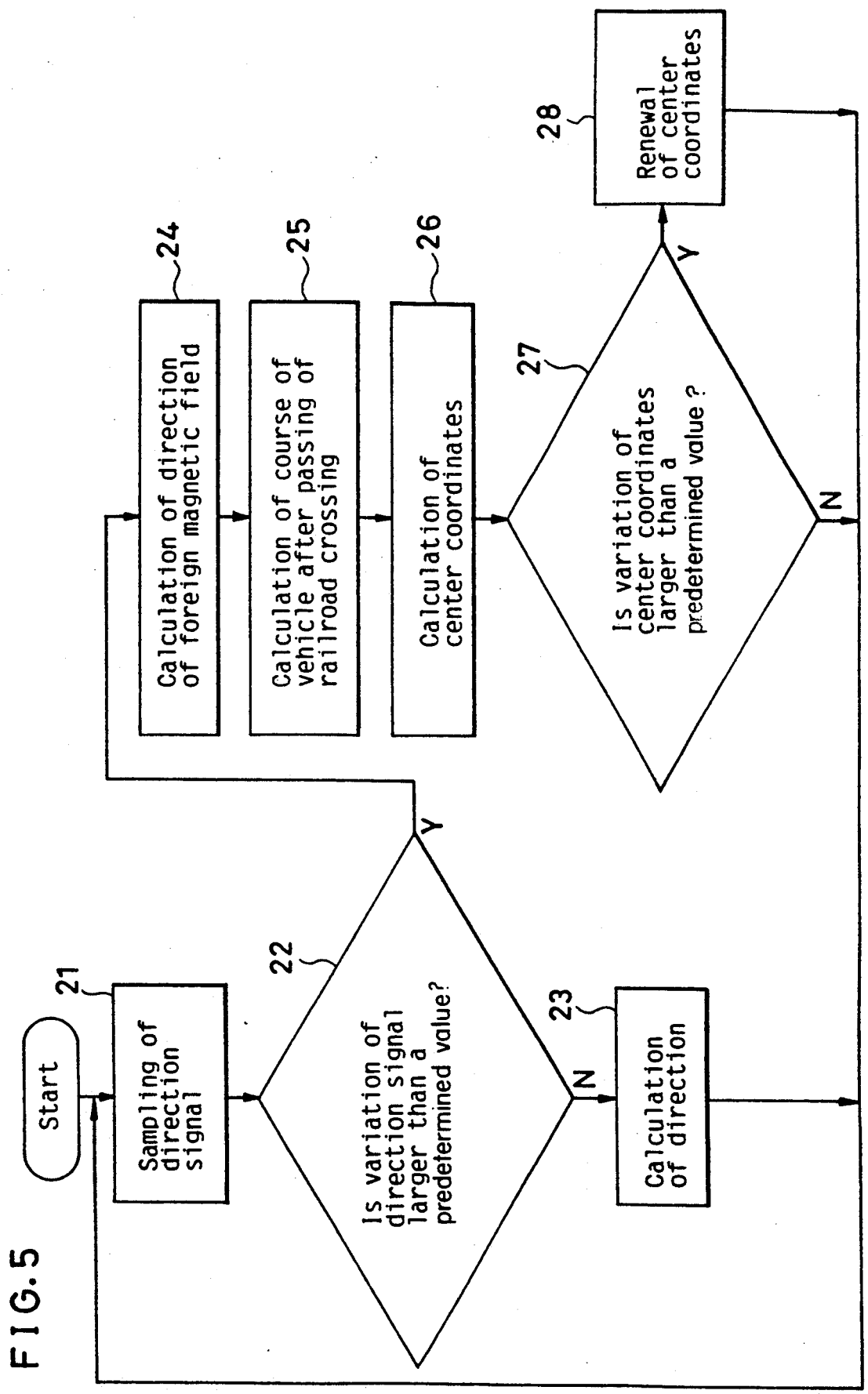
FIG. 5 is a flow chart of operation of the embodiment.
Figure 6:
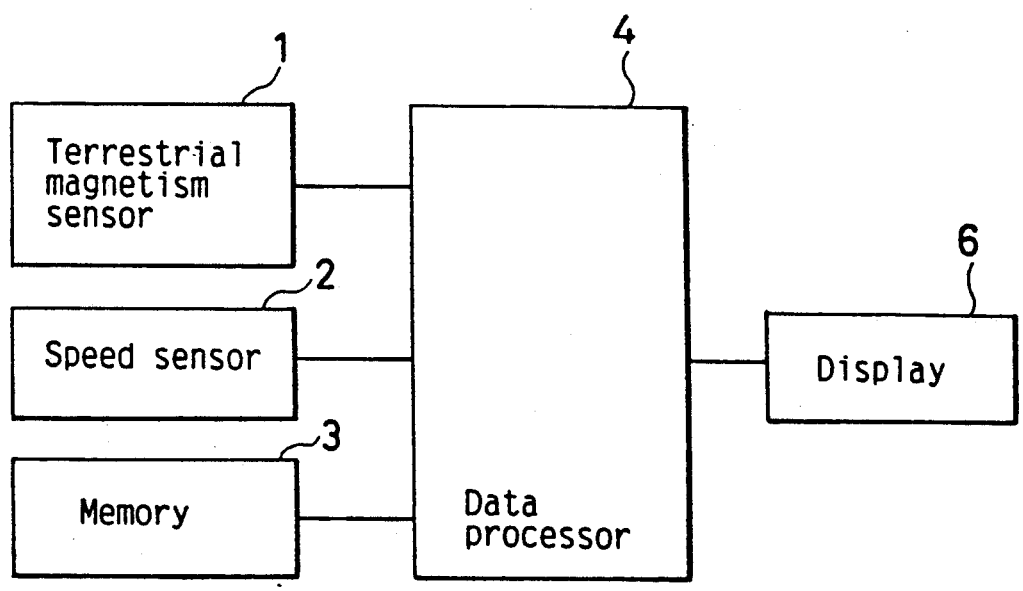
FIG. 6 is a the block diagram of the navigation system of a vehicle in the prior art.

Hereafter, the operation of the embodiment is elucidated with reference to the flow chart shown in FIG. 5. The direction signal of the terrestrial magnetism sensor 1 is sampled with a predetermined periodic time (1.0 second, for example) for A/D converting (Step 21). The sampled and digitized direction signal together with the data of the output circle memorized in the output circle calculation circuit 12 are applied to the foreign magnetic field sensing circuit 15. In the foreign magnetic field sensing circuit 15, the sampled direction signal is compared with the direction signal of the output circle memorized in the output circle calculation circuit 12. When the difference between them (variation of detected value of the terrestrial magnetism sensor 1) is larger than 10% of the intensity of the direction signal corresponding to the radius of the output circle, for example, it is determined whether the magnetization of the vehicle is varied by the foreign magnetic field (Step 22). If so, the flow proceeds to Step 24. If not, flow goes to Step 23 where the position of the vehicle is calculated followed by the flow returning to Step 21.

Subsequently, the direction of the foreign magnetic field is sensed as described hereafter (Step 24). When the variation of the direction signal per the unit time of the sampling periodic time becomes the maximum value during passing the railroad crossing, an X direction variation (dx) and a Y direction variation (dy) of the outputs from the terrestrial magnetism sensor 1 is detected. Then, the direction $\theta$ of the foreign magnetic field with respect to the abscissa X is given by $$\theta = \arctan(dy/dx) \qquad (1).$$

Figure 4:
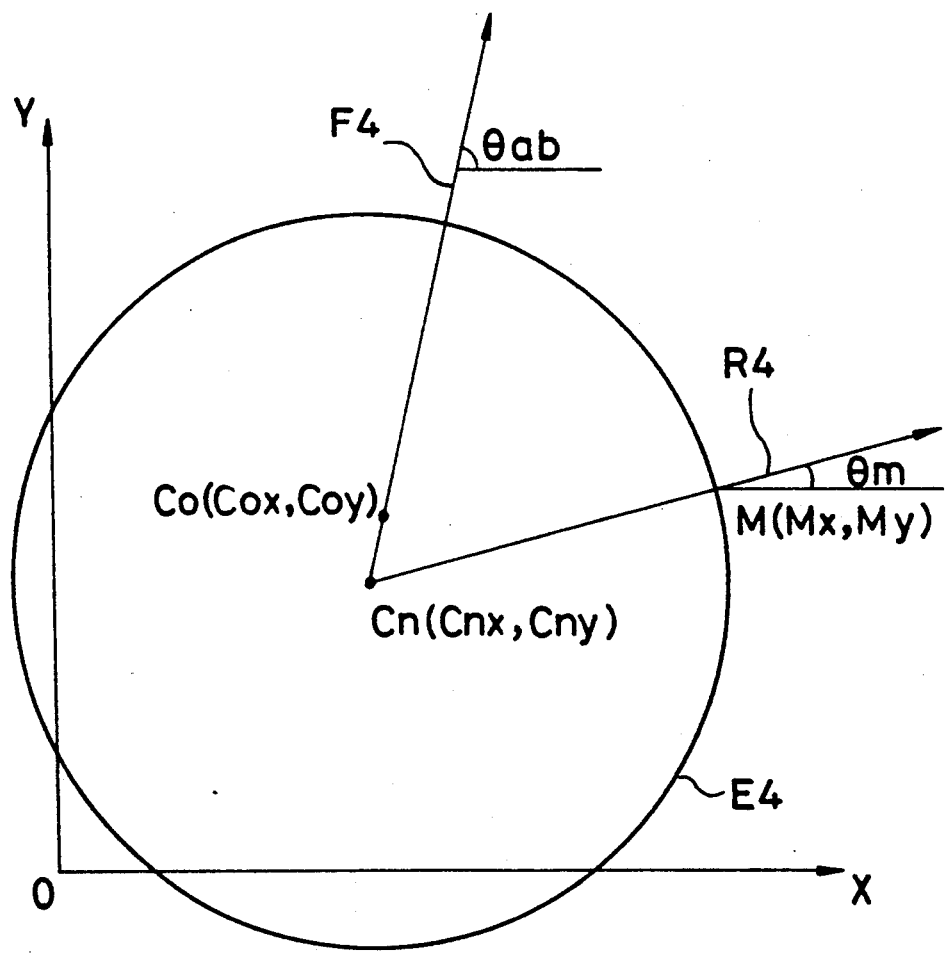
FIG. 4 is a graph of the output circle for elucidating shift of the center thereof.

FIG. 4 is a graph of an output circle E4 after passing the railroad crossing. Referring to FIG. 4, the direction of the foreign magnetic field is shown by an arrow F4, and the angle $\theta ab$ between the arrow F4 and the abscissa X is given by the equation (1). The course of the vehicle after passing the railroad crossing shown by an arrow R4 is computed as follows. The vehicle is first driven for a predetermined distance (50-100 m, for example) after passing of the railroad crossing, and the variation of the course of the vehicle is detected by the angular velocity sensor 13. Then, the detected angular velocity value is applied to the direction assuming circuit 14, and a corrected course R4 is determined by correcting the course before passing the railroad crossing which is inputted from the output circle calculation circuit 12 (Step 25). The corrected course R4 is applied to the output circle center calculation circuit 16 which calculates new center coordinates.

Subsequently, the angle $\theta m$ between the arrow R4 and the abscissa X is given by the following equation (2):

$$\theta_m = \arctan((My - Cny)/(Mx - Cnx)) \qquad (2).$$

Therein, the coordinate Cn (Cnx, Cny) represents the new center of the output circle E4 which is moved to a new position on the X-Y coordinates, and the coordinate M (Mx, My) represents a position on the output circle E4 which is obtained on the basis of the direction signal of the terrestrial magnetism sensor 1 after passing the railroad crossing.

According to the actual measurement described with reference to FIG. 2, it is assumed that the center (Cn) of the output circle after passing the railroad crossing is on the prolonged line of the arrow F4 which shows the direction of the foreign magnetic field, at a position in inverse direction to the direction of the foreign magnetic field with respect to the center (Co). Therefore, the new center coordinate Cn (Cnx, Cny) is obtained by evaluating an intersection of the straight line of the arrow F4 and the straight line of the arrow R4. The straight line shown by the arrow F4 is given by $$y = x \cdot \tan(\theta ab) + Coy - Cox \cdot \tan(\theta ab) \qquad (3).$$

The straight line shown by the arrow R4 is given by $$y = x \cdot \tan(\theta_m) + My - Mx \cdot \tan(\theta_m) \qquad (4).$$

The components Cnx and Cny of the intersection of both the straight lines are given by equations (5) and (6) by using the equations (3) and (4) as follows:

$$Cnx = (My - Mx \cdot \tan(\theta_m) - Coy + Cox \cdot \tan(\theta ab))/(\tan(\theta ab) - \tan(\theta_m)) \qquad (5),$$

and $$Cny = (\tan(\theta ab) \cdot (My - Mx \cdot \tan(\theta_m)) - \tan(\theta) \cdot (Coy - Cox \cdot \tan(\theta ab)))/(\tan(\theta ab) - \tan(\theta_m)) \qquad (6).$$

Consequently, the center coordinate Cn (Cnx, Cny) of the output circle corresponding to the variation of the magnetization of the vehicle after passing the railroad crossing is obtained by the above-mentioned operation (Step 26).

Subsequently, it is examined whether the difference between the new center coordinate (Cn) and the former center coordinate (Co) is larger than a predetermined value (20% of the direction signal corresponding to the radius of the output circle, for example) (Step 27). When the difference is larger than the predetermined value, the center coordinate (Co) of the output circle memorized in the output circle calculation circuit 12 is replaced with the new center coordinate (Cn) (Step 28). This replacement is done by output circle center renewal circuit 17. When the difference is not larger than the predetermined value, flow returns to Step 21.

In the embodiment, the assumed course of the vehicle after passing of the railroad crossing is computed on the basis of the detected value of the angular velocity sensor 13. The angular velocity sensor can also calculate on the basis of a received signal of the Global Positioning System (wherein a wireless signal is transmitted by a satellite, and a vehicle can detect its position by receiving the wireless signal) or a sign post (wherein a wireless signal is transmitted from apparatuses placed at sides of the road, and a vehicle can detect its direction of the road by receiving the wireless signal).

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A direction finding apparatus for a vehicle comprising:

a terrestrial magnetism sensor mounted on the vehicle, having two sensor elements arranged orthogonally to each other and mounted on the vehicle in a vertical plane with respect to one another for detecting a terrestrial magnetism and producing a signal indicative of terrestrial magnetism;

magnetization intensity data storing means for determining a first intensity of magnetization of said vehicle on the basis of outputs of said two sensor elements of said terrestrial magnetism sensor in an X-Y coordinate system based on a 360° turning of said vehicle on the ground and for storing said first intensity as a magnetization intensity;

foreign magnetic field sensing means for sensing a direction of a foreign magnetic field which is caused by a current flowing through electricity transmission lines, such as a railroad track, when the vehicle passes through said foreign magnetic field;

course finding means for determining a course of said vehicle on the basis of the signal indicative of terrestrial magnetism and the intensity of magnetization;

direction determining means for determining an assumed direction based on the course of said vehicle determined by said course finding means and said first intensity of magnetization calculated before said vehicle passed through said foreign magnetic field after each time the vehicle has passed through said foreign magnetic field;

magnetization intensity determining means for determining a new intensity of magnetization after each time the vehicle passes through said foreign magnetic field by deriving an intersection of a first straight line, representing the direction of the foreign magnetic field detected by said foreign magnetic field sensing means and a second straight line, representing a course of said vehicle after said vehicle has passed through said foreign magnetic field detected by said direction determining means, on a plane including an output circle of a terrestrial magnetism, at which a center of said output circle of the terrestrial magnetism is positioned, data renewal means for storing the new intensity of magnetization obtained by said magnetization intensity determining means in said magnetization intensity data storing means as a new magnetization intensity after each time the vehicle has passed through said foreign magnetic field, and output means connected to the output of the direction determining means for continuously outputting data indicative of a direction of the vehicle based on the signal indicative of terrestrial magnetism and the magnetization intensity.

2. A direction finding apparatus in accordance with claim 1, wherein said magnetization intensity data storing means comprises calculation means for calculating said first intensity of magnetization and memory means for storing the renewed intensity of magnetization by said data renewal means.

3. A direction finding apparatus in accordance with claim 1, wherein said direction determining means comprises an angular velocity sensor for detecting turning of said vehicle, and said direction is computed using the output of said angular velocity sensor and said course derived by said course finding means before passing through said foreign magnetic field.

* * * * *